US008831031B2

(12) United States Patent
Tzannes et al.

(10) Patent No.: US 8,831,031 B2
(45) Date of Patent: *Sep. 9, 2014

(54) SYSTEMS AND METHODS FOR MULTI-PAIR ATM OVER DSL

(71) Applicant: TQ Delta, LLC, Austin, TX (US)

(72) Inventors: Marcos C. Tzannes, Orinda, CA (US); Edmund Reiter, Lincoln, MA (US); Chistopher Cahill, Northboro, MA (US)

(73) Assignee: TQ Delta, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/863,058

(22) Filed: Apr. 15, 2013

(65) Prior Publication Data
US 2013/0223453 A1 Aug. 29, 2013

Related U.S. Application Data

(63) Continuation of application No. 12/783,777, filed on May 20, 2010, now Pat. No. 8,422,511, which is a continuation of application No. 12/769,277, filed on Apr. 28, 2010, now Pat. No. 7,978,706, which is a continuation of application No. 12/247,741, filed on Oct. 8, 2008, now Pat. No. 7,809,028, which is a continuation of application No. 10/264,258, filed on Oct. 4, 2002, now Pat. No. 7,453,881.

(60) Provisional application No. 60/327,440, filed on Oct. 5, 2001.

(51) Int. Cl.
*H04J 3/16* (2006.01)
*H04L 12/54* (2013.01)
*H04L 25/14* (2006.01)
*H04L 12/70* (2013.01)

(52) U.S. Cl.
CPC ............ *H04L 12/5601* (2013.01); *H04L 25/14* (2013.01); *H04L 2012/565* (2013.01); *H04L 2012/5615* (2013.01); *H04L 2012/5674* (2013.01); *H04L 2012/5672* (2013.01)
USPC ........ 370/465; 370/395.1; 370/535; 370/401; 370/437

(58) Field of Classification Search
None
See application file for complete search history.

(56) References Cited

U.S. PATENT DOCUMENTS 5,287,513 A 2/1994 Ferguson
5,684,958 A 11/1997 Adachi et al.

(Continued)

FOREIGN PATENT DOCUMENTS

| WO | WO 97/29559 | 8/1997 |
| WO | WO 00/48408 | 8/2000 |
| WO | WO 01/63859 | 8/2001 |

OTHER PUBLICATIONS

ITU-T Recommendation G.992.1, "Asymmetric digital subscriber line (ADSL) transceivers," Telecommunication Standardization Sector of ITU, Jun. 1999, 256 pages.

(Continued)

*Primary Examiner* — Duc C Ho
(74) *Attorney, Agent, or Firm* — Jason H. Vick; Sheridan Ross, PC

(57) ABSTRACT

At a transmitter, an ATM cell stream is received from the ATM layer and is distributed on a cell-by-cell bases across multiple DSL PHY's. At the receiver, the cells from each DSL PHY are re-combined in the appropriate order to recreate the original ATM cell stream, which is then passed to the ATM layer.

22 Claims, 8 Drawing Sheets

(56) References Cited

U.S. PATENT DOCUMENTS

| | | | |
|---|---|---|---|
| 5,875,192 | A | 2/1999 | Cam et al. |
| 6,002,670 | A | 12/1999 | Rahman et al. |
| 6,134,246 | A | 10/2000 | Cai et al. |
| 6,222,858 | B1 | 4/2001 | Counterman |
| 6,252,878 | B1 | 6/2001 | Locklear, Jr. et al. |
| 6,258,878 | B1 | 7/2001 | Bahadur et al. |
| 6,286,049 | B1 | 9/2001 | Rajakarunanayake et al. |
| 6,690,666 | B1 * | 2/2004 | Norrell et al. ............ 370/386 |
| 6,731,678 | B1 | 5/2004 | White et al. |
| 6,771,671 | B1 | 8/2004 | Fields et al. |
| 6,775,268 | B1 * | 8/2004 | Wang et al. ............ 370/352 |
| 6,775,305 | B1 | 8/2004 | Delvaux |
| 7,023,829 | B1 | 4/2006 | Holmquist et al. |
| 7,068,657 | B2 | 6/2006 | Keller-Tuberg |
| 7,154,895 | B1 | 12/2006 | Bornemisza et al. |
| 7,203,206 | B2 | 4/2007 | Amidan et al. |
| 7,453,881 | B2 * | 11/2008 | Tzannes et al. ............ 370/395.1 |
| 7,809,028 | B2 | 10/2010 | Tzannes et al. |
| 7,978,706 | B2 | 7/2011 | Tzannes et al. |
| 2002/0006128 | A1 | 1/2002 | Yehuda et al. |
| 2002/0181458 | A1 | 12/2002 | Amidan et al. |
| 2010/0290471 | A1 | 11/2010 | Tzannes et al. |
| 2013/0290558 | A1 * | 10/2013 | Mapp et al. ............ 709/232 |

OTHER PUBLICATIONS

ITU-T Recommendation G.992.3, "Asymmetric digital subscriber line transceivers 2 (ADSL2)," Telecommunication Standardization Sector of ITU, Jul. 2002, 312 pages.
International Search Report for International (PCT) Patent Application No. PCT/US02/31649, Date of Mailing Mar. 24, 2003.
Written Opinion for International (PCT) Patent Application No. PCT/US02/31649, mailed Nov. 7, 2003.
International Preliminary Examination Report for International (PCT) Patent Application No. PCT/US02/31649, Date of Mailing Mar. 5, 2004.
Supplementary European Search Report for European Patent Application No. 02778433, dated Nov. 14, 2005.
Official Action for European Patent Application No. EP02778433, dated Apr. 13, 2010.
Notice of Intent to Grant European patent for European Patent Application No. 02778433.9, dated Feb. 6, 2012.
Decision to Grant a European Patent Pursuant to Article 97(1) EPC for European Patent Application No. 027784339., mailed Jun. 28, 2012.
Extended European Search Report for European Application No. 12002728.9 mailed Sep. 14, 2012.
Communication Pursuant to Rule 69 EPC and Rule 70a(1) EPC for European Application No. 12002728.9 mailed Oct. 22, 2012.
Official Action for Canadian Patent Application No. 2,461,320, dated Jun. 10, 2008.
Official Action for Canadian Patent Application No. 2,461,320, dated Sep. 28, 2009.
Notice of Allowance for Canadian Patent Application No. 2,461,320, dated Feb. 18, 2011.
Official Action for U.S. Appl. No. 10/264,258, mailed Oct. 18, 2006.
Official Action for U.S. Appl. No. 10/264,258, mailed Apr. 27, 2007.
Official Action for U.S. Appl. No. 10/264,258, mailed Jan. 28, 2008.
Notice of Allowance for U.S. Appl. No. 10/264,258, mailed Sep. 23, 2008.
Official Action for U.S. Appl. No. 12/247,741, mailed Nov. 20, 2009.
Official Action for U.S. Appl. No. 12/247,741, mailed Apr. 14, 2010.
Notice of Allowability for U.S. Appl. No. 12/247,741, mailed Jul. 29, 2010.
Supplemental Notice of Allowability for U.S. Appl. No. 12/247,741, mailed Aug. 3, 2010.
Notice of Allowability for U.S. Appl. No. 12/247,741, mailed Aug. 27, 2010.
Official Action for U.S. Appl. No. 12/769,277, mailed Jan. 10, 2011.
Official Action for U.S. Appl. No. 12/769,277, mailed Apr. 13, 2011.
Notice of Allowance for U.S. Appl. No. 12/769,277, mailed May 19, 2011.
Official Action for U.S. Appl. No. 12/783,777, mailed Feb. 15, 2011.
Official Action for U.S. Appl. No. 12/783,777, mailed Nov. 18, 2011.
Official Action for U.S. Appl. No. 12/783,777, mailed Jun. 6, 2012.
Official Action for U.S. Appl. No. 12/783,777, mailed Aug. 16, 2012.
Notice of Allowance for U.S. Appl. No. 12/783,777, mailed Jan. 4, 2013.

* cited by examiner

| Bit | 8 | 7 | 6 | 5 | 4 | 3 | 2 | 1 |
|---|---|---|---|---|---|---|---|---|
| Byte 1 | Flow Control (GFC) | | | | VPI Value | | | |
| Byte 2 | VPI Value | | | | VCI Value | | | |
| Byte 3 | VCI Value | | | | | | | |
| Byte 4 | VCI Value | | | | Payload Type | | | |
| Byte 5 | HEC | | | | | | | |

Fig. 13

| Bit | 8 | 7 | 6 | 5 | 4 | 3 | 2 | 1 |
|---|---|---|---|---|---|---|---|---|
| Byte 1 | Flow Control (GFC) | | | | TIV | | MP Cntr | |
| Byte 2 | MP Counter | | | | | | Reserved | |
| Byte 3 | Reserved | | | | | | | |
| Byte 4 | Reserved | | | | Payload Type | | | CLP |
| Byte 5 | HEC | | | | | | | |

Fig. 14

SYSTEMS AND METHODS FOR MULTI-PAIR ATM OVER DSL

RELATED APPLICATION DATA

This application is a continuation of U.S. patent application Ser. No. 12/783,777, filed May 20, 2010, now U.S. Pat. No. 8,422,511, which is a continuation of U.S. patent application Ser. No. 12/769,277, filed Apr. 28, 2010, now U.S. Pat. No. 7,978,706, which is a continuation of U.S. patent application Ser. No. 12/247,741, filed Oct. 8, 2008, now U.S. Pat. No. 7,809,028, which is a continuation of U.S. patent application Ser. No. 10/264,258, filed Oct. 4, 2002, now U.S. Pat. No. 7,453,881, which claims the benefit of and priority under 35 U.S.C. §119(e) to U.S. Patent Application Ser. No. 60/327,440, filed Oct. 5, 2001, entitled "Multi-Pair ATM Over DSL," each of which are incorporated herein by reference in their entirety.

BACKGROUND OF THE INVENTION

1. Field of the Invention

The systems and methods of this invention generally relate to communication systems. In particular, the systems and methods of this invention relate to asynchronous transfer mode (ATM) over digital subscriber line (DSL).

2. Description of Related Art

FIG. 1 illustrates the conventional configuration of a system for transporting ATM over DSL using a single latency ADSL configuration. As of the time of filing, single latency is most common form of ADSL deployment. Further details of this specific architecture can be found in DSL Forum Recommendation TR-042, incorporated herein by reference in its entirety.

For the system illustrated in FIG. 1, the access node 10 serves as an ATM layer multiplexer/concentrator between the ATM core network 2 and the access network. As described in the above referenced DSL Forum Recommendation, for ATM systems, the channelization of different payloads is embedded within the ATM data stream using different virtual paths (VP) and/or virtual channels (VC). In the downstream direction, the VP/VC Mux module 16 and VPI/VCI translation module 14 receive cells from the core network interface element 12 and function to perform cell routing based on a virtual path identifier (VPI) and/or virtual channel identifier (VCI) to the appropriate ATU-C 18. In the upstream direction, the VP/VC Mux module 16 and the VPI/VCI translation module 14 function to combine the cell streams from the ATU-C's 18 into a single ATM cell stream to the core ATM network 2.

The broadband network termination (B-NT) 100 performs the functions of terminating the ADSL signal entering the user's premises via the twisted pair cable and the ATU-R 22 and provides either the T, S or R interface towards the premises distribution network/terminal equipment 4. The access ATM module 26 and the VP/VC Mux module 24 perform the ATM layer functions to support the TC layers in the ATU-R. The broadband network termination 100 may also contain VPI/VCI translation functions to support multiplex/demuliplex of VC's between the ATU-R 22 and the premise distribution network/terminal equipment 4 on a VPI and/or VCI bases. The broadband network termination 100 may also comprise a PDN/TE interface element 28 and SAR module 30 the functions of which are well known and will be omitted for sake of clarity.

SUMMARY OF THE INVENTION

The exemplary systems and methods of this invention combine multiple DSL PHY's, i.e., multiple twisted wire pairs, to, for example, generate a high data rate connection for the transport of an ATM cell stream between the service provider and, for example, a DSL subscriber. The ATM cell stream may contain one or more payloads where each payload is channelized within the ATM data stream using different virtual paths (VP) and/or virtual channels (VC). At a transmitter, the ATM cell stream received from the ATM layer is distributed on a cell-by-cell bases across the multiple DSL PHY's. At the receiver, the cells from each DSL PHY are re-combined in the appropriate order to recreate the original ATM cell stream, which is then passed to the ATM layer.

Accordingly, aspects of the invention relate to ATM communications.

Additional aspects of the invention relate to transporting ATM over DSL, and more particularly over ADSL.

Additional aspects of the invention also relate to distributing ATM cells from a single ATM cell stream across multiple twisted wire pairs.

Further aspects of the invention relate to distributing ATM cells from a single ATM cell stream across multiple DSL communication links.

Further aspects of the invention relate to varying data rates over the multiple twisted wire pairs over which distributed ATM cells are transported.

These and other features and advantages of this invention are described in, or apparent from, the following detailed description of the embodiments.

BRIEF DESCRIPTION OF THE DRAWINGS

The embodiments of the invention will be described in detailed, with reference to the following figures, wherein:

FIG. 13 illustrates a standard five byte ATM UNI header;

FIG. 14 illustrates an exemplary modified ATM header according to this invention.

DETAILED DESCRIPTION OF THE INVENTION

The exemplary systems and the methods of this invention will be described in relation to digital subscriber line communications and more particularly to asymmetric digital subscriber line communications. However, to avoid unnecessarily obscuring the present invention, the following description omits well-known structures and devices that may be shown in block diagram form or otherwise summarized. For the purposes of explanation, numerous specific details are set forth in order to provide a thorough understanding of the present invention. It should be appreciated however that the present invention may be practiced in variety of ways beyond the specific details set forth herein. For example, the systems and methods of this invention can generally be applied to any type of communications system including wireless communication systems, such as wireless LANs, power line communications, or any other systems or combination systems that use ATM.

Furthermore, while the exemplary embodiments illustrated herein show the various components of the communication system collocated, it is to be appreciated that the various components of the system can be located at distant portions of distributed network, such as a telecommunications network and/or the Internet, or within a dedicated ATM over DSL system. Thus, it should be appreciated that the components of the communication system can be combined into one or more devices or collocated on a particular node of a distributed network, such as a telecommunications network. It will be appreciated from the following description, and for reasons of computational efficiency, that the components of the communication system can be arranged at any location within a distributed network without affecting the operation of the system.

Furthermore, it should be appreciated that the various links connecting the elements can be wired or wireless links, or a combination thereof or any other know or later developed element(s) that is capable of supplying and/or communicating data to and from the connected elements. Additionally, the term module as used herein can refer to any know or later developed hardware, software, or combination of hardware and software that is capable of performing the functionality associated with that element.

Additionally, although this invention will be described in relation to ATM systems, the systems and methods of this invention can be applied to any transport protocol that uses cells or packets for transmitting information. Therefore, for example, the same methods can be used for the bonding of PHYs that transport Ethernet or IP packets. Furthermore, although this invention will be described in relation to ATM transported over DSL PHYs, other PHYs, such as cable, voice band modems, ATM-25, and the like, can also be used.

Figure 1:
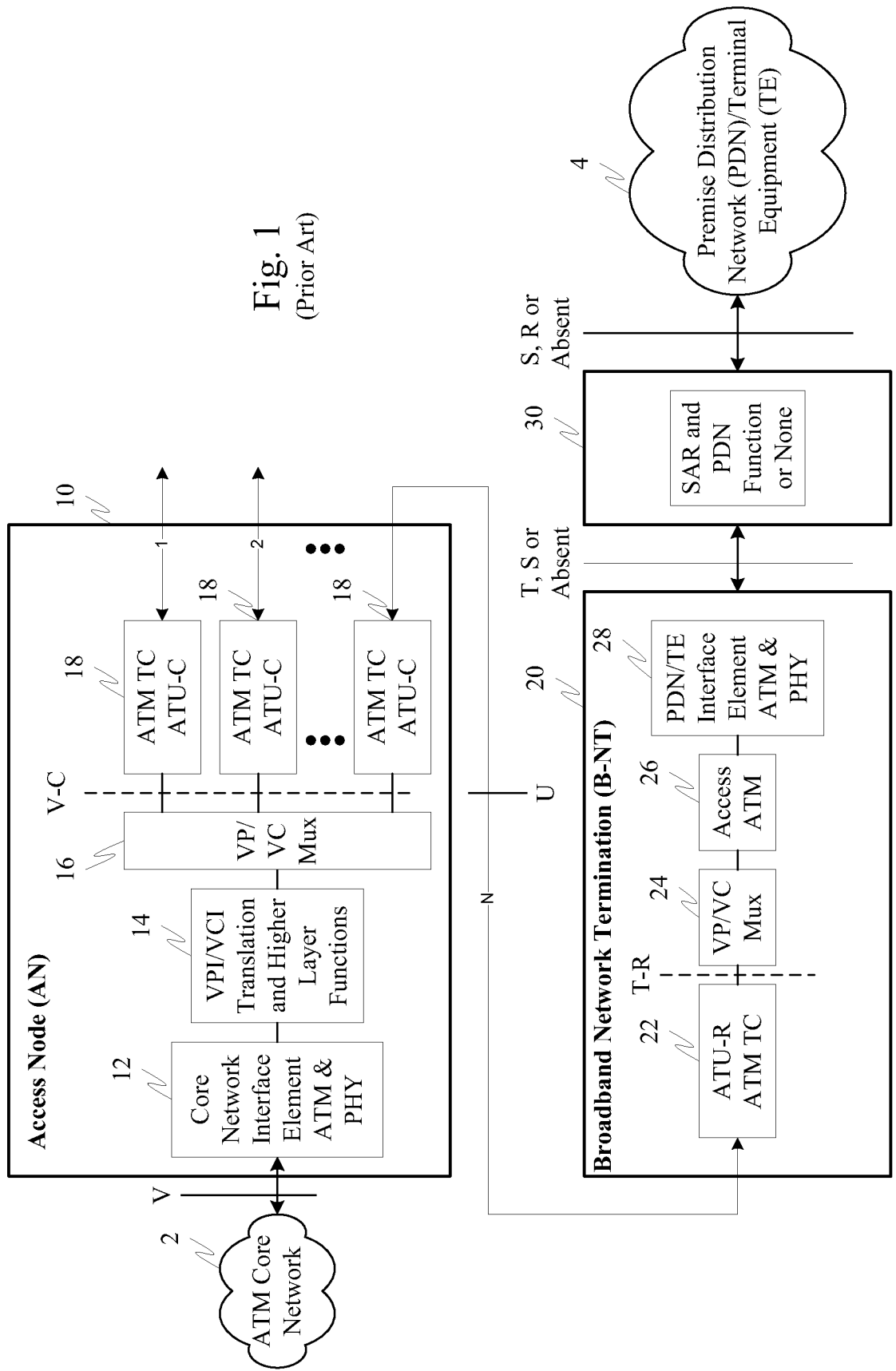
FIG. 1 is a functional block diagram illustrating a conventional ATM over ADSL system.
Figure 2:
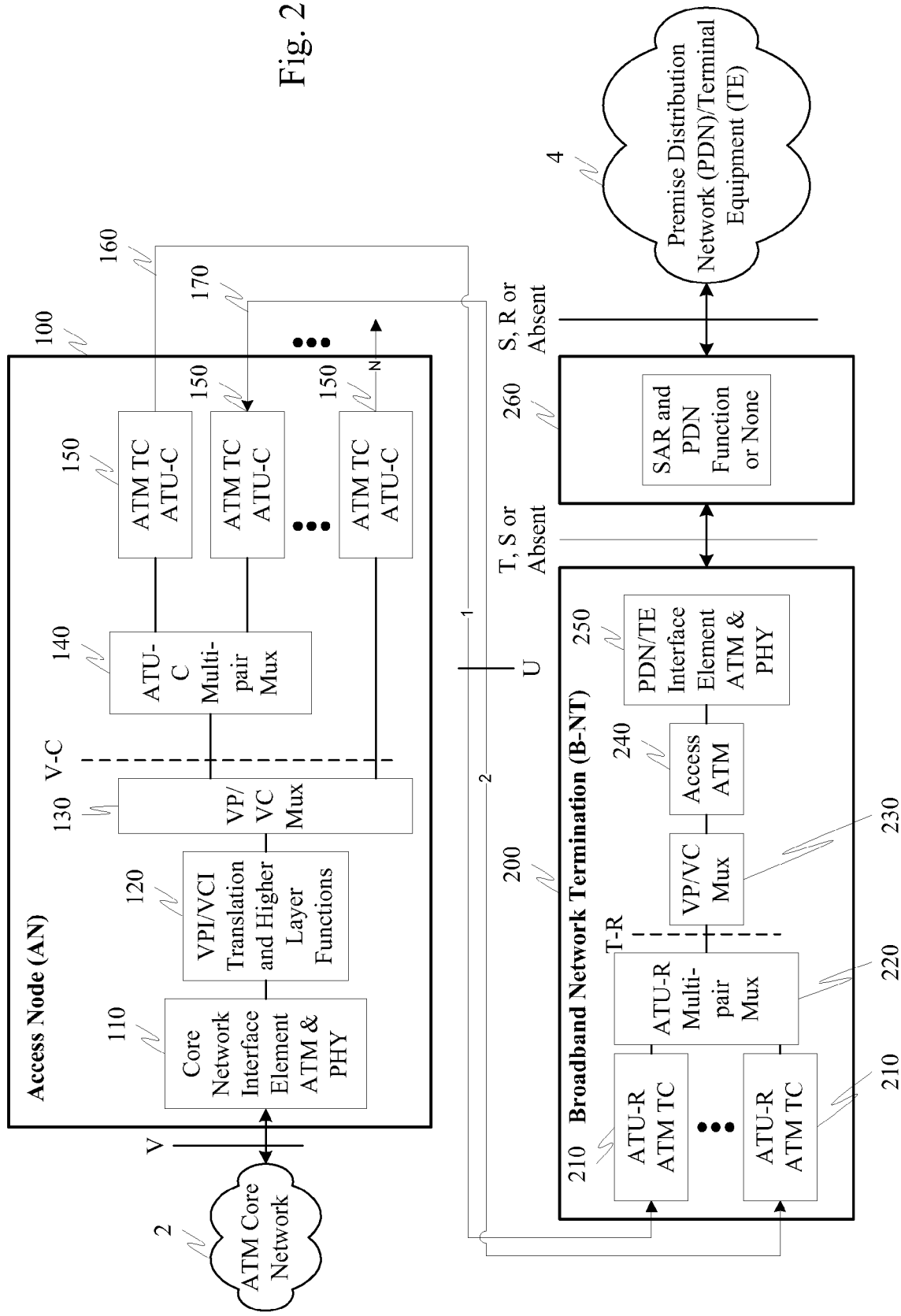
FIG. 2 is a functional block diagram illustrating an exemplary system for transporting ATM over ADSL according to this invention.

FIG. 2 illustrates an exemplary multi-pair ATM over DSL system. In particular, the system comprises an access node 100, a broadband network termination 200, an ATM core network 2 and premise distribution network/terminal equipment 4. The access node 100 further comprises a core network interface element 110, a VPI/VCI translation module 120, a VP/VC Mux module 130, an ATU-C multi-pair multiplexer 140 and a plurality of ATM TC ATU-C modules 150. The broadband network termination 200 further comprises a plurality of ATU-R ATM TCs 210, an ATU-R multi-pair multiplexer 220, a VP/VC Mux module 230, an access ATM module 240, and a PDN/TE interface module 250. Furthermore, the system comprises a SAR and PDN function module 260, wherein the functions of like components have been discussed in relation to FIG. 1.

The exemplary system illustrated in FIG. 2 distributes ATM cells from a single ATM cell stream across multiple ADSL PHY links, i.e., multiple twisted wire pairs (1 to n). The ATM cell stream, also referred to as the ATM stream, may comprise one or more payloads where each payload is channelized within the ATM stream using different virtual paths (VP) and/or virtual channels (VC). This can effectively create, for example, a high data rate ATM connection between a service provider and an ADSL subscriber.

In accordance with an exemplary embodiment of this invention, the ATU-C multi-pair multiplexer 140 is inserted between the VP/VC multiplexer 130 and the ATU-C's 150 at the V-C interface in the access node 100. Additionally, the ATU-R multi-pair multiplexer 220 is added to the broadband network termination 200 at the T-R interface. Both of these multi-pair multiplexers have transmitter and receiver sections (not shown) whose operations are comparable. The multi-pair multiplexer transmitter section performs the task of distributing cells from the ATM stream among multiple ATM cell substreams. Each ATM cell substream, also referred to as an ATM substream, is forwarded a different ATU. The multi-pair multiplexer receiver section performs the task of recombining the ATM substreams to regain the original ATM stream.

In the exemplary system illustrated in FIG. 2, two ADSL PHYs 160 and 170 are "bonded" together to transport a single ATM cell stream. However, it should be appreciated, that the number of ADSL PHYs "bonded" together can be easily expanded to any number (N≥2) of ADSL PHYs thereby, for example, enabling higher ATM data rates. In addition to the two ADSL PHYs 160 and 170 that are bonded together, it should further be appreciated that in some instances in the same access node 100, other ADSL PHYs may be operating in the traditional way. Obviously, the ADSL PHYs operating the traditional way do not need to be connected to the multi-pair multiplexer 140. Thus, in general, it should be appreciated that any combination of "bonded" and unbonded, i.e. traditional, ADSL PHY's, may be configured between the access node 100 and the broadband network determination 200. Furthermore, it should be appreciated that all of the ADSL PHYs can be bonded together.

In may ADSL systems, the logical interface between the ATM layer the PHY is based on UTOPIA Level 2 with a cell level handshake. This same UTOPIA Level 2 logical interface can also be used between the multi-pair multiplexer and the ATM layer and also between the multi-pair multiplexer and the PHY in the access node 100 and the broadband network termination 200. Although, the above example and the remainder of this discussion will be directed toward the multi-pair multiplexer functions using a ADSL PHY, any version of DSL that has an ATM-TC, e.g., VDSL, SHDSL, or the like, may be used instead of, or conjunction with, the ADSL PHY.

Figure 3:
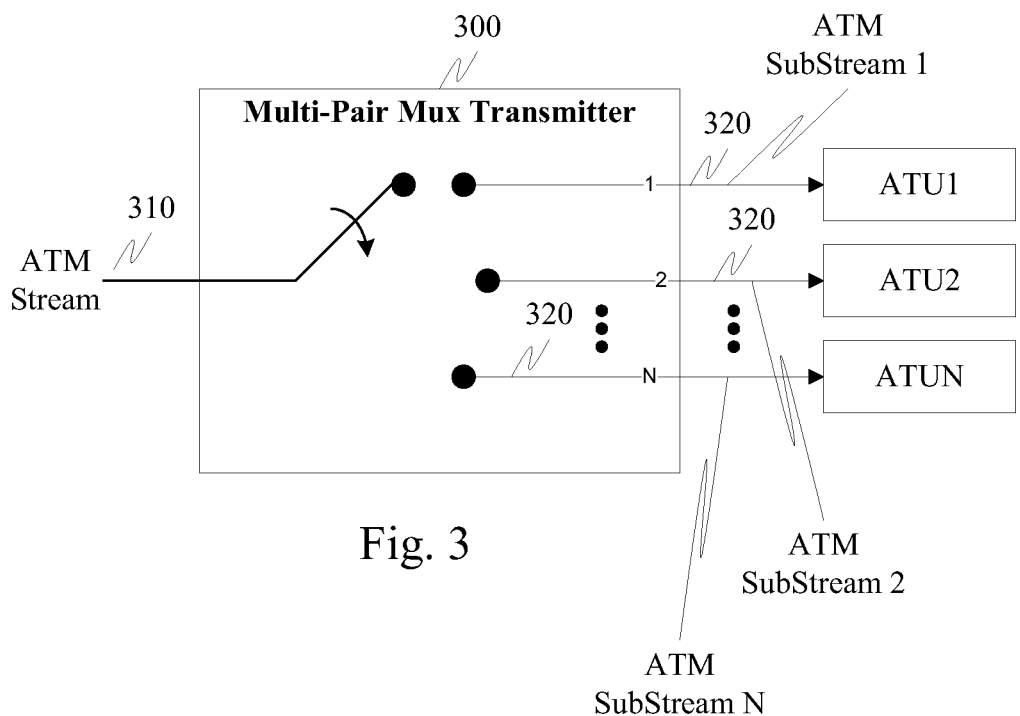
FIG. 3 illustrates an exemplary functional block diagram of the multi-pair multiplexing transmitter according to this invention.

FIG. 3 illustrates an exemplary multi-pair multiplexing transmitter according to this invention. The ATU-C and ATU-R multi-pair multiplexer box provide the same basic transmitter and receiver functions and thus can be summarized as one unit.

In particular, the exemplary multi-pair multiplexing transmitter 300 illustrated in FIG. 3 provides, but not limited to, accepting a single ATM stream 310 from the ATM layer and distributing the cells among N ATM substreams 320, where N≥2. Furthermore, the multi-pair multiplexing transmitter 300 maps each ATM cell substream to a different DSL connection and provides as output these ATM cell substreams to the appropriate ADSL PHY (ATUx). For the exemplary multi-pair multiplexing transmitter 300 illustrated in FIG. 3, the cells from the ATM stream 310 are distributed amongst the ATM substreams 320 based on the data rate of each DSL PHY.

Figure 4:
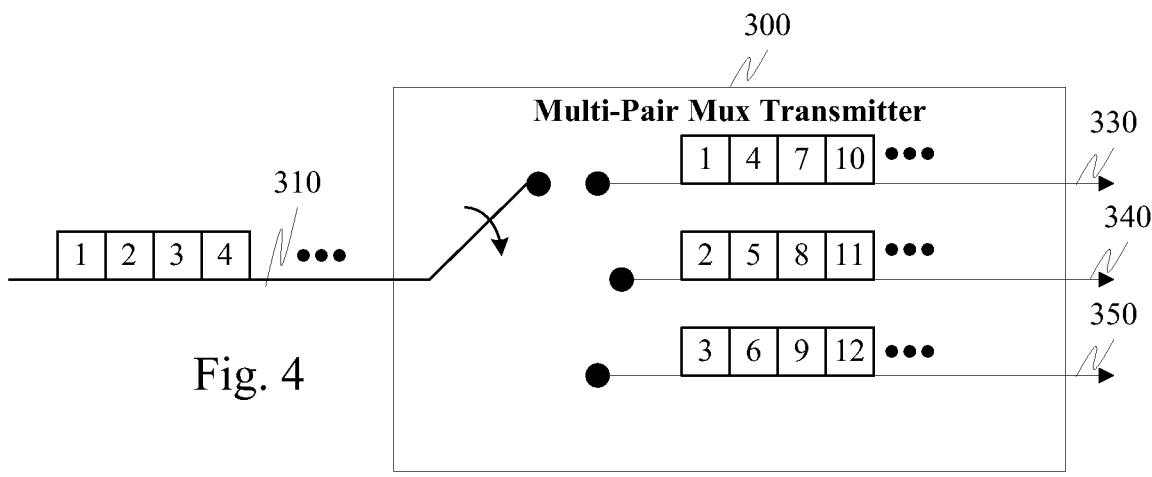
FIG. 4 illustrates a functional block diagram of a second exemplary multi-pair multiplexing transmitter according to this invention.

The configuration of the multi-pair multiplexing transmitter 300 can be varied to, for example, provide an equal or unequal data rate on the DSL PHYs. FIG. 4 illustrates an exemplary embodiment where an equal data rate is applied to all of the DSL PHYs. In particular, if the data rate on all of the DSL PHYs is the same, then an equal number of ATM cells will be transported over every PHY connection. In this case, the multi-pair multiplexing transmitter 300 sends the first ATM cell to ATU1 330, the second ATM cell to ATU2 340, the third ATM cell to ATU3 350, and so on. For the multi-pair multiplexing transmitter 300 illustrated in FIG. 4, N=3 and an equal data rate on all DSL PHYs is illustrated, therefore the input ATM cells from the ATM stream 310, as discussed above, are distributed equally and sequentially among the DSL PHYs.

Figure 5:
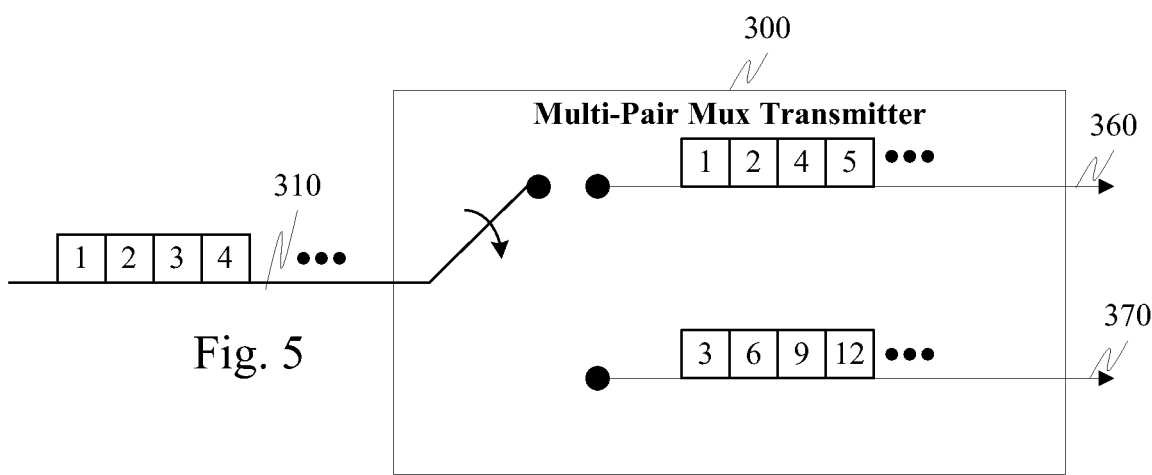
FIG. 5 illustrates a functional block diagram of a third exemplary embodiment of the multi-pair multiplexing transmitter according to this invention.

For the multi-pair multiplexing transmitter 300 illustrated in FIG. 5, an unequal data rate is transported on the DSL PHYs. In particular, if a data rate on all the DSL PHYs is not equal, the ATM cells can be forward to the DSL PHYs, at, for example, a ratio that matches the ratios of the available PHY data rates. If, for example, N=2, as illustrated in FIG. 5, and the data rate of the first DSL PHY 360 is two times the data rate of the second PHY 370, then the multi-pair multiplexer 300 would send 2 ATM cells to the first DSL PHY, i.e., cells 1 and 2, and then send 1 ATM cell to the second DSL PHY, i.e., cell 3. However, in general, this basic concept can be expanded at least to include the situation where N>2 and to non-integer data rate ratios.

For example, in a two modem environment where there is a "high-speed" and a "low-speed" implementation, an exemplary ratio of N:1 where N=2 to 8 can be specified. This means that the "high-speed" modem will have eight times the cells as the "low-speed" modem. In this exemplary configuration, there are eight cells of receiver FIFO meaning that the entire "high-speed" receiver could be empted before needing to service the "low-speed" receiver.

Figure 6:
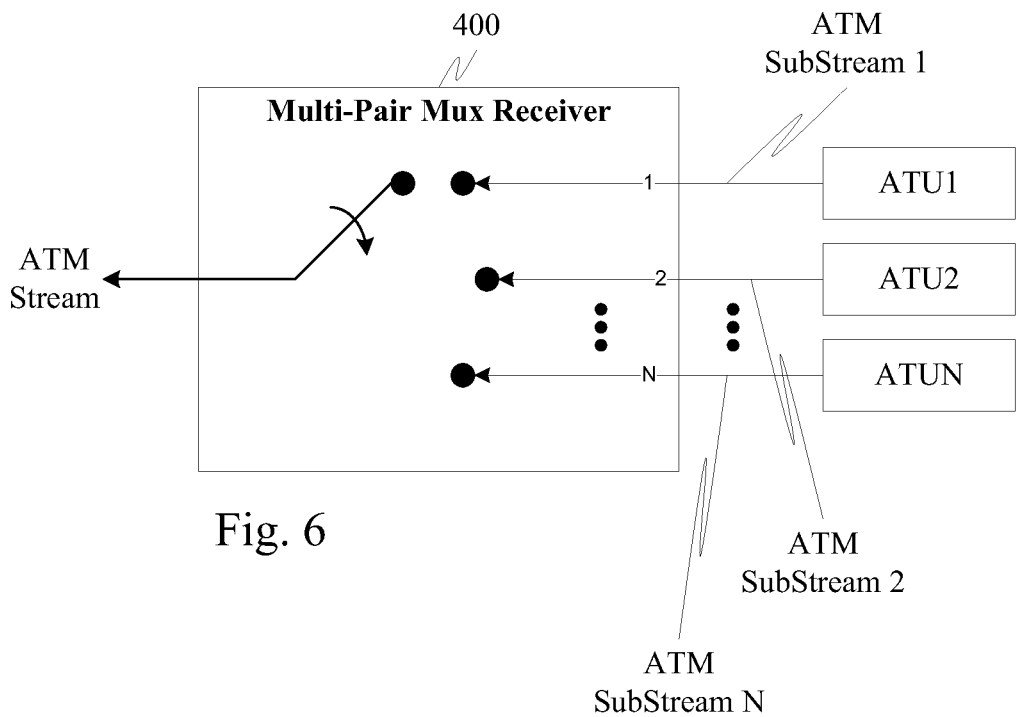
FIG. 6 illustrates a functional block diagram of an exemplary multi-pair multiplexing receiver according to this invention.
Figure 7:
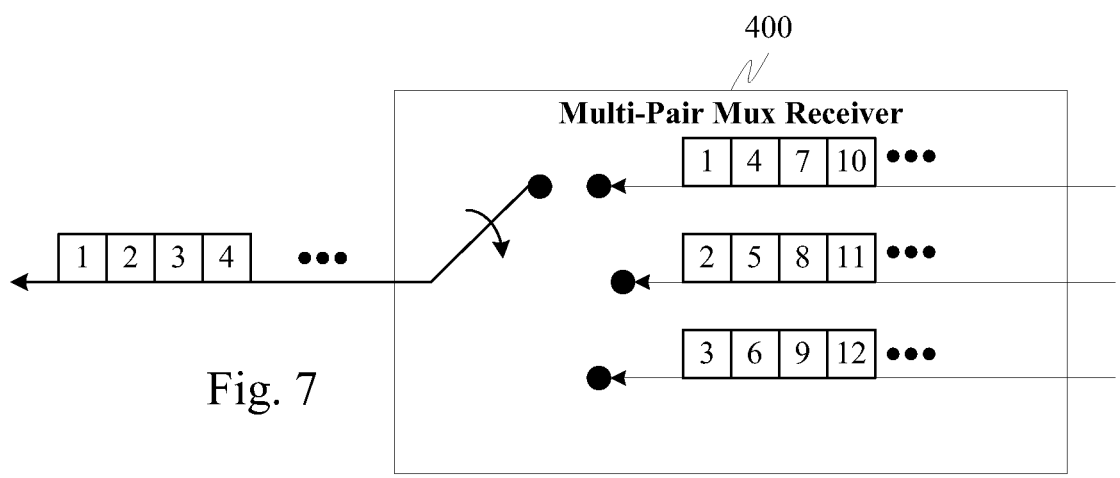
FIG. 7 illustrates a functional block diagram of a second exemplary multi-pair multiplexing receiver according to this invention.

FIG. 6 illustrates an exemplary multi-pair multiplexing receiver 400. The exemplary multi-pair multiplexing receiver 400 provides, but is not limited to, accepting multiple ATM cell substreams from different DSL PHYs and recombining the ATM cells from the different ATM cell substreams to recreate the original ATM stream, which is passed to the ATM layer. In particular, and as illustrated in FIG. 6, a plurality of ATM substreams are received by the multi-pair multiplexing receiver 400 and recombined into the original ATM stream. Specifically, as in the multi-pair multiplexing transmitter, the recombining of cells from the DSL PHYs depends on the data rates of the individual PHY connections. As in the embodiment discussed in relation to FIG. 4, where all DSL PHYs had an equal data rate, the multi-pair multiplexing receiver 400 can perform the inverse of the transmitting multiplexer function and reconstruct the original ATM stream by taking one cell from each ATM substream and combining them in the appropriate order, as illustrated in FIG. 7.

Figure 8:
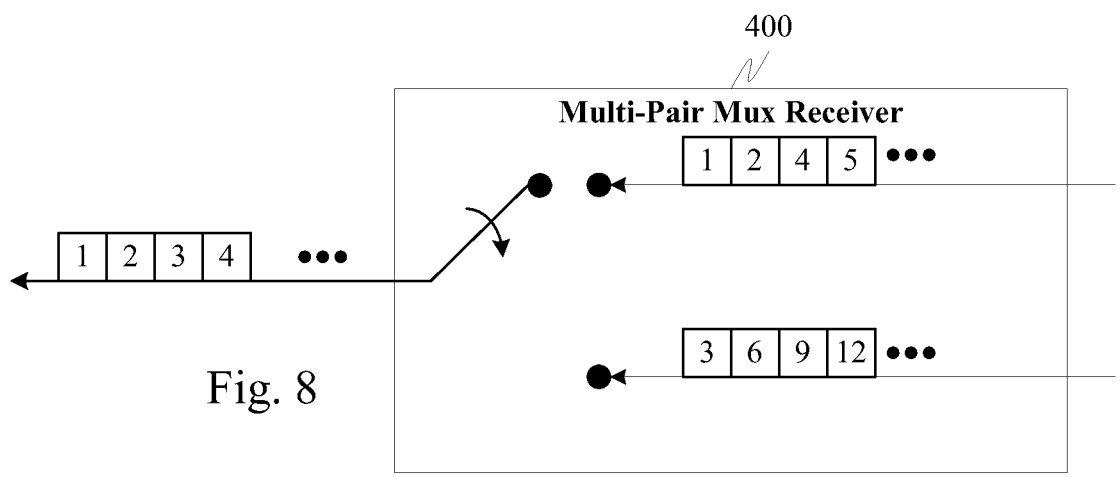
FIG. 8 illustrates a functional block diagram of a third exemplary multi-pair multiplexing receiver according to this invention.

Similarly, as illustrated in relation to the multi-pair multiplexing transmitter 300 illustrated in FIG. 5, where the DSL PHYs had an unequal data rate, if different ratios of data rates are used a variable number of cells will be taken from each ATM substream to reconstruct the original ATM stream in the multi-pair multiplexing receiver 400 as illustrated in FIG. 8.

Furthermore, in an addition to the changes in data rate that are possible on the DSL PHYs, ATM cells transported over a DSL PHY can have different end-to-end delay (latency) based on several parameters. This potential latency difference between bonded PHYs places implementation requirements on the multi-pair multiplexer. In particular, the multi-pair multiplexer receiver must be able to reconstruct the ATM stream even if the ATM cells are not being received in the same order as they where transmitted.

For example, some of the exemplary reasons for having different delays over different DSL PHYs include, but are not limited, configuration latency which is based on the configuration of the DSL transmission parameters. Specifically, these parameters include the data rate, coding parameters, such as the coding method, codeword size, interleaving parameters, framing parameters, or the like.

ATM-TC latency is based on cell rate decoupling in the ATM-TC. Specifically, the ATM-TC block in ADSL transceivers performs cell rate decoupling by inserting idle cells according to the ITU Standard I.432, incorporated herein by reference in its entirety. This means that depending on the ATU timing and the state of the ATU buffers, an ATM cell that is sent over a DSL PHY will experience non-constant end-to-end delay (latency) through the PHY.

Wire latency is based on differences in the twisted wire pairs. Specifically, the DSL electrical signals can experience different delays based on the difference in length of the wire, the gauge of the wire, the number bridged taps, or the like.

Design latency is based on differences in the DSL PHY design. Specifically, the latency of the PHY can also depend on the design chosen by the manufacture.

Thus, as result of the different latencies in the PHYs, it is possible that an ATM cell that was sent over a DSL PHY may be received at the multi-pair multiplexing receiver after an ATM cell that was sent out later on a different DSL PHY.

Figure 9:
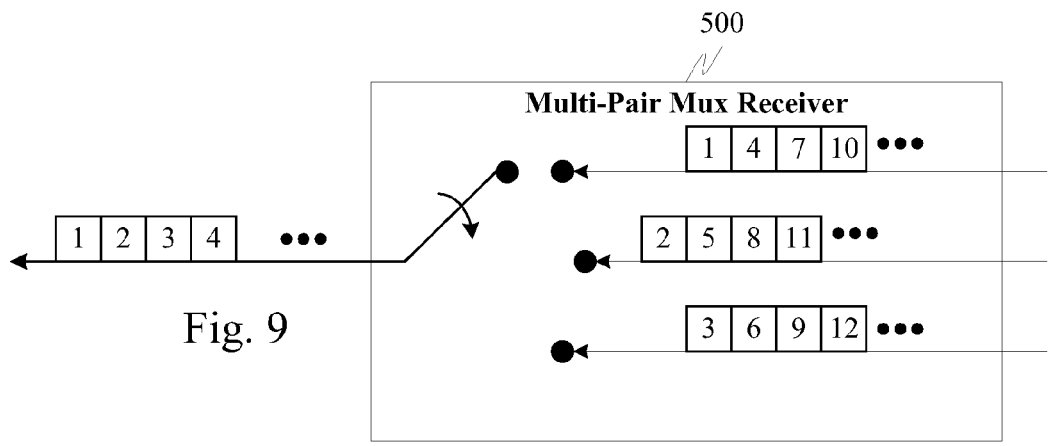
FIG. 9 is a functional block diagram illustrating a fourth exemplary multi-pair multiplexing receiver according to this invention.

FIG. 9 illustrates an example of variable delay based on the embodiment discussed in relation to FIG. 4. Therefore, the exemplary multi-pair multiplexing receiver 500 should be able to accommodate at least these types of variations in delay. An exemplary method for dealing with the issue of delay is to have cell buffers (not shown) in the multi-pair multiplexing receiver 500 that can provide the ability to compensate for the variations in delay. As example, if there is a cell buffer that can hold several ATM cells on each input ATM substream path, the multi-pair multiplexing receiver 500 can simply wait until, for example, cell number 1 comes in path number one, while path number two will buffer cell number 2 and wait for cell number 1 to be received. This method requires a cell buffer on each ATM substream path at the input of the multi-pair multiplexing receiver 500. The size of the cell buffer can be determined by, for example, the maximum difference in latency between the "bonded" PHYs. As an alternative, the buffer can be based on one large buffer with multiple pointers without effecting the operation of the system.

Another effective method of reducing the difference in latency between DSL PHYs is mandate that all DSL PHYs are configured with transmission parameters in order to provide the same configuration latency. An exemplary method of accomplishing the same configuration latency is by configuring the exact same data rate, coding parameters, interleaving parameters, etc. on all DSL PHYs. Alternatively, different PHYs can have, for example, different data rates but use the appropriate coding or interleaving parameters to have the same latency on all the bonded PHYs.

As an example, for Reed Solomon coding and interleaving functions as defined in ADSL standards G.992.1 and G.992.3, incorporated herein by reference in their entirety, the latency due to these functions is defined as:

Latency=$N*D/R$, where N is the number of bits in a codeword, D is the interleaver depth in codewords and R is the data in bits per second.

For example if N=1600 bits, i.e., 200 bytes, D=64 codewords and R=6400000 bps then:

Latency=1600*64/640000=0.016 seconds.

Therefore if, for example, two PHYs have different data rates, R1 and R2 then, in order to bond these PHYs together and have the same configuration latency set:

$N1*D1/R1=N2*D2/R2$, where N1 and N2 are the bits in a codeword for each PHY and D1 and D2 are the interleaver depths for each PHY.

This can also be rewritten as:

$N1*D1=(R1/R2)*N2*D2$.

Thus, in general, the N1, D1, N2 and D2 parameters must be chosen to satisfy the above equations and this can be accomplished in several ways.

For example, if the configuration latency is specified as 0.016 seconds, and R1=6400000 bps and R2=1600000 then, as described in the example above, N1 anss D1 can be configured as N1=1600 and D1=64. Therefore:

$N2*D2=(R2/R1)*D1*N1=(1600000/6400000)$
*1600*64=1600*64/4.

Therefore, for example, N2 and D2 can be configured as (N2=1600, D2=16) or (N2=400, D2=64) or (N2=800, D2=32), etc.

Obviously the same methods can be applied to more than 2 PHYs with different data rates.

The ATM-TC receiver in ADSL systems is specified to discard ATM cells that are received with an incorrect cyclic redundancy check, e.g., (HEC). This means that if there are bit errors as the result of transmission over the ADSL channel, ATM cells will be discarded by the ATM-TC and not sent to the multi-pair multiplexing receiver. As a result of this type of error condition, ATM cells may be received out of order in the multi-pair multiplexing receiver.

Figure 10:
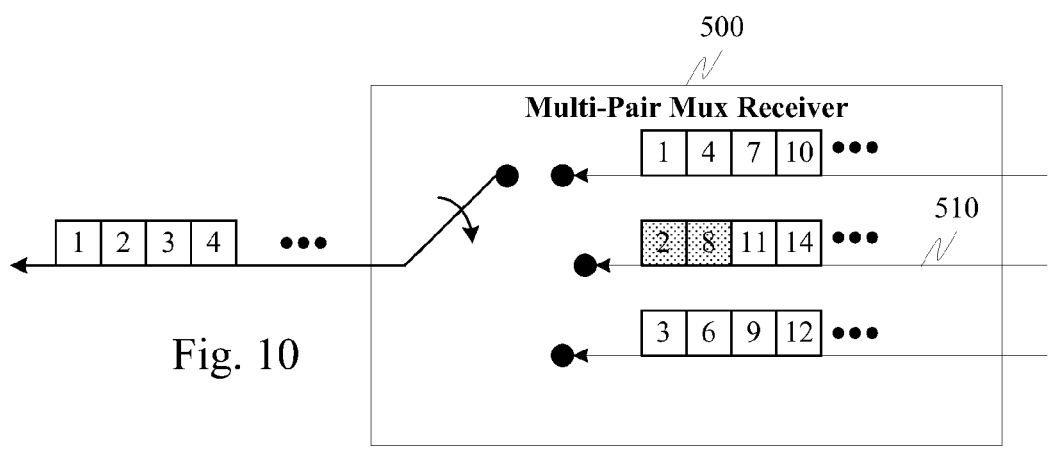
FIG. 10 illustrates a functional block diagram of a fifth exemplary multi-pair multiplexing receiver according to this invention.

FIG. 10 illustrates an exemplary multi-pair multiplexing receiver 500 with a single ATM cell lost due to PHY channel errors using the exemplary embodiment discussed in relation to FIG. 4. In FIG. 10, ATM cell number 5 was discarded by the second DSL PHY 510 due to, for example, a HEC error. Therefore, if the multi-pair multiplexing receiver 500 is not aware of this error, the ATM cells stream can not be reconstructed appropriately.

The exemplary systems and methods of this invention utilize a multi-pair cell counter to operate in the condition where the ATM cells are discarded by DSL PHY when, for example, HEC errors occur. The multi-pair multiplexing transmitter can embed the multi-pair cell counter in the header of each ATM cell after receiving the ATM cell from the ATM layer. At the receiver, the multi-pair multiplexing receiver reads the multi-pair cell counter and removes it from the header of the ATM cell prior to sending the ATM cell to the ATM layer. The multi-pair cell counter is a value that indicates the position of a particular ATM cell in the ATM cell stream.

In its simplest form, the multi-pair cell counter can be a modulo L counter that starts at, for example, zero and increments by one for each consecutive ATM cell up to a value L-1. For example, if L equals 256, the value of the multi-pair cell counter could start at zero and increment by one up to a value of 255. After 255, the multi-pair counter could be started at zero again, and so on.

Figure 11:
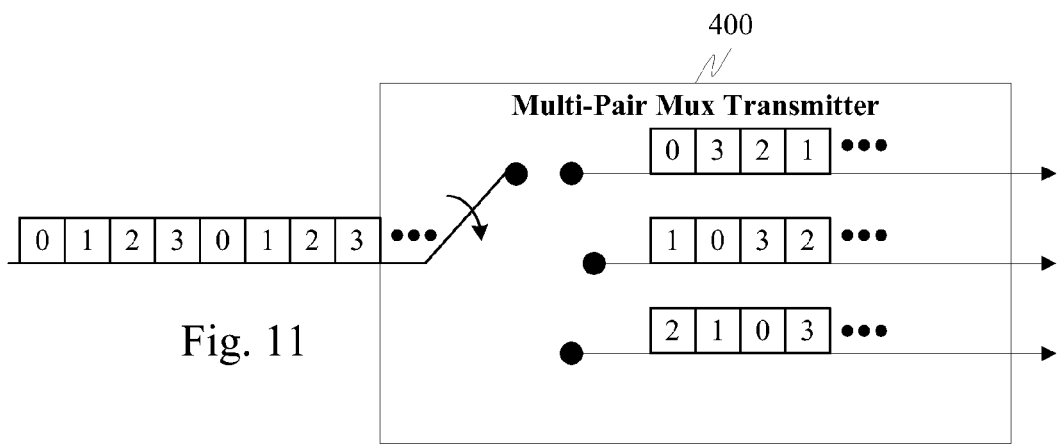
FIG. 11 illustrates a functional block diagram of a fourth exemplary multi-pair multiplexing transmitter according to this invention.

As previously discussed, the multi-pair cell counter can be embedded in the ATM cell header of all the ATM cells in the ATM stream. FIG. 11 illustrates the multi-pair multiplexing transmitter 400 as discussed in relation to the example illustrated in FIG. 4, with L equal to 4 and the multi-pair cell counter specified inside the ATM cell header. At the receiver, the multi-pair cell counter is read by the multi-pair multiplexing receiver and removed from the ATM cell header. The multi-pair multiplexing receiver uses the multi-pair cell counter to properly recombine the ATM cells to reconstruct the ATM stream. Therefore, as in the example above, where a cell was discarded by the DSL PHY, the multi-pair multiplexing receiver would be able to determine this error and the ATM cell(s) placed in the appropriate order.

Figure 12:
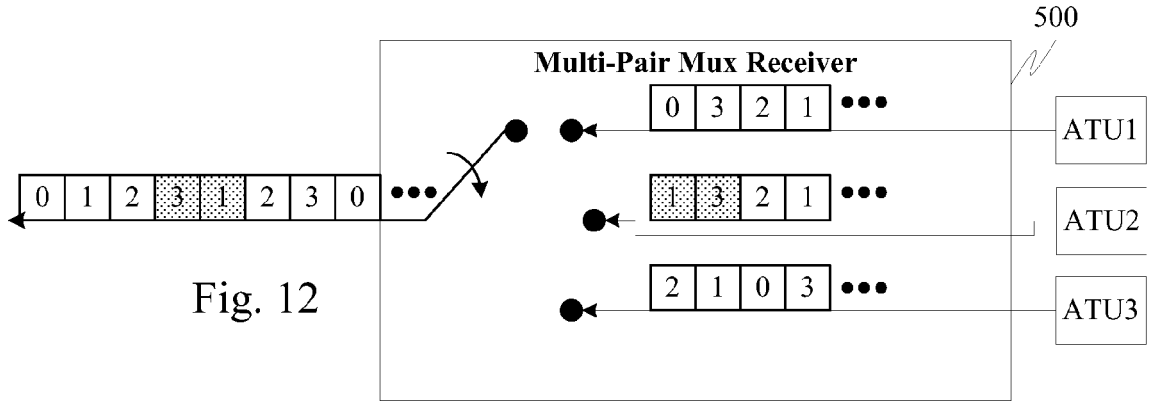
FIG. 12 is a functional block diagram illustrating a sixth exemplary multi-pair multiplexing receiver according to this invention.

FIG. 12 illustrates an example where the $5^{th}$ ATM cell in the ATM stream was discarded by the PHY. The $5^{th}$ ATM cell in the exemplary ATM stream has a multi-pair cell counter number equal to 0 and was sent on the second ATU. The exemplary multi-pair multiplexing receiver 500 can check the multi-pair cell count value of the ATU's ATM cell before inserting the cell back into the ATM stream. In this manner, when the multi-pair multiplexing receiver checks the ATM cell counter from the second ATU and reads a multi-pair cell count 3 instead of zero, the multi-pair multiplexing receiver can determine that the ATM cell with the multi-pair cell counter equal to 0 was discarded by the second ATU PHY. In this case, multi-pair multiplexing receiver will not take a cell from the ATU-2 ATM substream. Instead, the multi-pair multiplexing receiver will move to the next ATU in order to check the multi-pair cell count value, and insert the ATM cell back into the ATM stream if the multi-pair cell count is correct, and continue. Therefore, as a result of using the multi-pair cell counter, the multi-pair multiplexing receiver can properly reconstruct the original ATM cell stream even in the presence of ATM cell lost.

The exemplary main multi-pair cell parameter is the value of L. The appropriate value of L depends on the number of bonded PHYs (N) and the maximum number (M) of consecutive ATM cells that may be discarded by the PHY. The design constraint on L is that it must be large enough so that the multi-pair multiplexing receiver can still detect cell lost even when the maximum number of consecutive ATM cells are discarded by a PHY. This places the constraint that $L>N*M$. For example, if there are N=4 bonded PHYs, and the maximum number of consecutive ATM cells that may discarded by the PHY is M=50, then L>200. If, for example L is chosen to be equal to 256, then even when 50 consecutive ATM cells are lost, the multi-pair multiplexing receiver can accurately detect the error event.

There are several exemplary methods to embedding the multi-pair cell counter into the ATM cell header including, but not limited to, using the GFC field in the UNI ATM header. The GFC field is currently not used and is typically set to zero. The GFC field is a four bit field therefore the maximum value of L is 16. This could pose an issue when the channel has, for example, impulse noise and the PHY data rate is high resulting in cases where multiple ATM cells are often discarded by the PHY.

Therefore, as an alternative, bits in the VPI/VCI field can be used. The VPI field occupies 8 bits in the UNI header and identifies the route taken by the ATM cell. The VCI field occupies 16 bits in the UNI header and it identifies the circuit or connection number on the path. In order use the VPI/VCI field for the multi-pair cell counter, the multi-pair multiplexing transmitter overwrites bits in the VPI/VCI field with the multi-pair cell counter value on a cell by cell bases. At the receiver, the multi-pair multiplexing receiver reads the multi-pair cell counter value and resets and overwrites the VPI/VCI back to the original value.

This method requires the multi-pair multiplexing receiver to have knowledge of the overwritten VPI/VCI bits. As an example, this can be accomplished by communicating the VPI/VCI fields of the ATM stream during initialization/configuration of the DSL connection or during configuration or re-configuration of the ATM connection. Since the VPI/VCI field has 24 bits, the L value for the multi-pair cell counter can be set to a very large number.

One exemplary method for embedding the multi-pair cell counter in the VPI/VCI field is to construct a table of all, or a portion of, possible VPI/VCI values that may be transported by the bonded DSL PHYs. This VPI/VCI table can, for example, be stored in the multi-pair multiplexing transmitters and receivers for all PHYs. The table maps a VPI/VCI value to a table index value that is also stored in the multi-pair multiplexing transmitters and receivers for all PHYs. If there are K VPI/VCI values being transported over the bonded DSL PHYs, the VPI/VCI value could be mapped to a number from zero to K-1. At the multi-pair multiplexing transmitter, the VPI/VCI value in the ATM header is replaced with the table index value. Since there are limited numbers of VPI/VCI going to a single subscriber, the table index value can utilize only a fraction of the 24 bits available in the VPI/VCI field. Therefore, the multi-pair multiplexing transmitter can use the remaining VPI/VCI bits to transport, for example, the multi-pair cell counter.

At the receiver, the multi-pair multiplexing receiver is multi-pair cell counter that reconstructs the ATM stream as discussed above. Additionally, the multi-pair multiplexing receiver can read the table index value in the ATM header and write the VPI/VCI value corresponding to the table index value as stored in the VPI/VCI table back into the VPI/VCI header field.

As a simple example, where only one VPI/VCI is being sent over the bonded DSL connection, the VPI/VCI table will have only one value. Therefore, in this case, it is not necessary to insert the table index value at the transmitter. The transmitter may use the bits in the VPI/VCI field for the multi-pair cell counter. At the receiver, the multi-pair cell counter is read and used to reconstruct the ATM stream. Since only one VPI/VCI value is being used, the receiver can reset the VPI/VCI field to the appropriate value prior to sending the ATM stream into the ATM layer. This approach can work, for example, with many consumer based employments of a DSL, since in most cases a single VPI/VCI is used.

As an alternative, consider a four VPI/VCI situation.

TABLE 1

| VPI/VCI Table | |
|---|---|
| VPI/VCI Value | Table Index Value (TIV) |
| Va (24 bit value) | 0 |
| Vb (24 bit value) | 1 |
| Vc (24 bit value) | 2 |
| Vd (24 bit value) | 3 |

Table 1 contains an exemplary VPI/VCI table with four VPI/VCI addresses. Additionally, for the purpose of this example, the multi-pair cell counter is specified to be an eight bit counter, i.e., a modulo 255 counter.

FIG. 13 illustrates the format for the standard five bit ATM UNI header. The VPI/VCI values in Table 1 corresponds to the 24 bit VPI/VCI values in the UNI ATM header.

FIG. 14 illustrates an exemplary format of the ATM header after the multi-pair multiplexing transmitter has replace the VPI/VCI values with the table index value and then embedded the multi-pair cell counter in the VPI/VCI field. The first two bits the VPI/VCI field are used to transport the table index value (TIV) and the next eight bits are used to transport the multi-pair cell counter. The remaining bits can be reserved and can be used, for example, by the multi-pair multiplexing blocks for other purposes, such as the transportation of messages between the multi-pair multiplexing blocks, or the like.

At the receiver, the multi-pair multiplexing receiver reads the multi-pair cell counter value from the header in order to properly reconstruct the ATM stream. The multi-pair multiplexing receiver also reads the TIV in the ATM header and writes the VPI/VCI corresponding to the table index value as stored in the VPI/VCI table back into the VPI/VCI header field. As a result, at the output of the multi-pair multiplexing receiver, the ATM header can be completely reconstructed into the standard UNI format comprising the original data contents.

In this illustrative example, there were four VPI/VCI addresses being used in cells being transported over the bonded ADSL system. However, in many deployments, the VP is determined in the DSLAM, which means that the VPI field is the same for all packets. Therefore, in the case of terminating the VP and the DSLAM, the VP field could, for example, be used in transporting the TIV.

Figure 15:
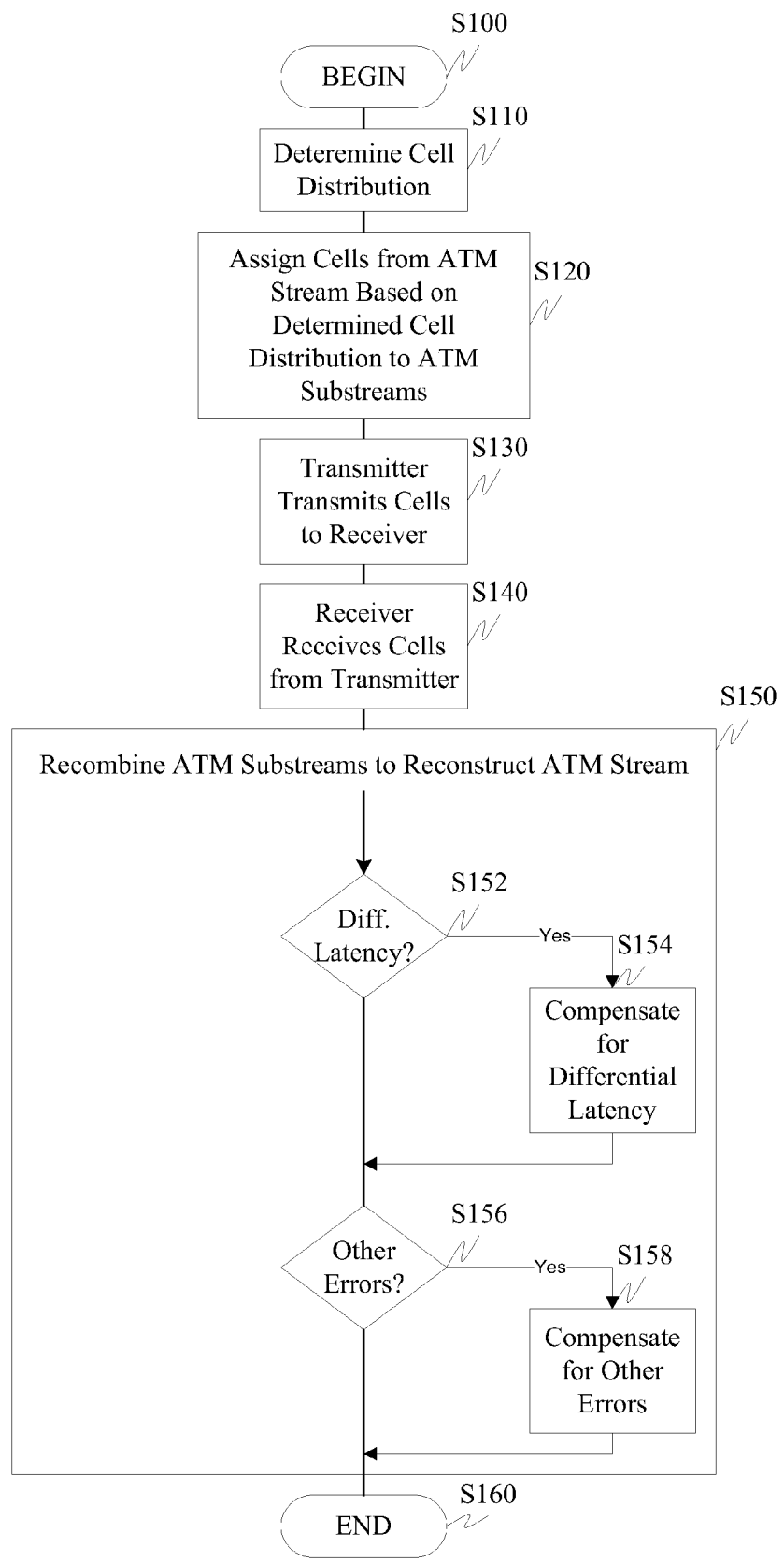
FIG. 15 is a flowchart outlining an exemplary embodiment of a method for combining multiple DSL PHYs to transport an ATM cell stream between a service provider and a subscriber.

FIG. 15 illustrates an exemplary method of transporting ATM over DSL. In particular control begins in step S100 and continues to step S110. In step S110 the cell distributions are determined, for example, based on differing data rates between the DSL PHYs, or the like. Next, in step S120 the cells from the ATM stream are assigned based on the determined cell distribution to the appropriate ATM TC cell stream. Then, in step S130, the cells are transmitted to a receiver. Control then continues to step S140.

In step S140, a receiver receives the cells. Next, in step S150, the ATM substreams are combined to reconstruct the ATM stream. In particular, in step S152, a determination is made whether there is a difference in latency between the DSL lines. If there are differential latency problems, control continues to step S154 where the differential latency is compensated for by, for example, buffering, or the like. Otherwise, control jumps to step S156.

In step S156, a determination is made whether other errors are present in one or more of the substreams. If other errors, such as dropped cells, channel bit errors, or the like are present, control continues to step S158 where the other errors are compensated for. Otherwise, control jumps to step S160 where the control sequence ends.

Figure 16:
FIG. 16 is a flowchart illustrating an exemplary method for reducing latency between DSL PHYs.

FIG. 16 is a flowchart illustrating an exemplary method for reducing latency between DSL PHYs. Control begins in step S200 and continues to Step S210. In Step S220, and as discussed, another effective method of reducing the difference in latency between DSL PHYs is mandate that all DSL PHYs are configured with transmission parameters in order to provide the same configuration latency. An exemplary method of accomplishing the same configuration latency is by configuring the exact same data rate, coding parameters, interleaving parameters, etc. on all DSL PHYs. Alternatively, different PHYs can have, for example, different data rates but use the appropriate coding or interleaving parameters to have the same latency on all the bonded PHYs.

One exemplary aspect combines multiple DSL PHY's, i.e., multiple twisted wire pairs, to, for example, generate a high data rate connection for the transport of an ATM cell stream between the service provider and, for example, a DSL subscriber. The ATM cell stream may contain one or more payloads where each payload is channelized within the ATM data stream using different virtual paths (VP) and/or virtual channels (VC). At a transmitter, the ATM cell stream received from the ATM layer is distributed on a cell-by-cell bases across the multiple DSL PHY's. At the receiver, the cells from each DSL PHY are re-combined in the appropriate order to recreate the original ATM cell stream, which is then passed to the ATM layer.

In particular, the exemplary multi-pair multiplexing transmitter illustrated in FIG. 3 provides, but not limited to, accepting a single ATM stream 310 from the ATM layer and distributing the cells among N ATM substreams 320, where N≥2. Furthermore, the multi-pair multiplexing transmitter 300 maps each ATM cell substream to a different DSL connection and provides as output these ATM cell substreams to the appropriate ADSL PHY (ATUx). For the exemplary multi-pair multiplexing transmitter 300 illustrated in FIG. 3, the cells from the ATM stream 310 are distributed amongst the ATM substreams 320 based on the data rate of each DSL PHY.

The configuration of the multi-pair multiplexing transmitter 300 can be varied to, for example, provide an equal or unequal data rate on the DSL PHYs. FIG. 4 illustrates an exemplary embodiment where an equal data rate is applied to all of the DSL PHYs. In particular, if the data rate on all of the DSL PHYs is the same, then an equal number of ATM cells will be transported over every PHY connection. In this case, the multi-pair multiplexing transmitter 300 sends the first ATM cell to ATU1 330, the second ATM cell to ATU2 340, the third ATM cell to ATU3 350, and so on. For the multi-pair multiplexing transmitter 300 illustrated in FIG. 4, N=3 and an equal data rate on all DSL PHYs is illustrated, therefore the input ATM cells from the ATM stream 310, as discussed above, are distributed equally and sequentially among the DSL PHYs.

In Step S230, an exemplary multi-pair multiplexing receiver 400 provides, but is not limited to, accepting multiple ATM cell substreams from different DSL PHYs and recombining the ATM cells from the different ATM cell substreams to recreate the original ATM stream, which is passed to the ATM layer. In particular, a plurality of ATM substreams are received by the multi-pair multiplexing receiver 400 and recombined into the original ATM stream. Specifically, as in the multi-pair multiplexing transmitter, the recombining of cells from the DSL PHYs depends on the data rates of the individual PHY connections. As in the embodiment discussed in relation to FIG. 4, where all DSL PHYs had an equal data rate, the multi-pair multiplexing receiver 400 can perform the inverse of the transmitting multiplexer function and reconstruct the original ATM stream by taking one cell from each ATM substream and combining them in the appropriate order, as illustrated in FIG. 7.

Similarly, as illustrated in relation to the multi-pair multiplexing transmitter 300 illustrated in FIG. 5, where the DSL PHYs had an unequal data rate, if different ratios of data rates are used a variable number of cells will be taken from each ATM substream to reconstruct the original ATM stream in the multi-pair multiplexing receiver 400 as illustrated in FIG. 8. Control then continues to step S240 where the control sequence ends.

The above-described ATM over DSL system can be implemented on a telecommunications device, such a modem, a DSL modem, an ADSL modem, a multicarrier transceiver, a VDSL modem, or the like, or on a separate programmed general purpose computer having a communications device. Additionally, the systems and methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, modem, transmitter/receiver, or the like. In general, any device capable of implementing a state machine that is in turn capable of implementing the flowchart illustrated herein can be used to implement the various ATM over DSL methods according to this invention.

Furthermore, the disclosed methods may be readily implemented in software using object or object-oriented software development environments that provide portable source code that can be used on a variety of computer or workstation platforms. Alternatively, the disclosed ATM over DSL system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The ATM over DSL systems and methods illustrated herein however can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software executed on programmed general purpose computer, a special purpose computer, a microprocessor, or the like. In these instances, the systems and methods of this invention can be implemented as program embedded on personal computer such as JAVA® or CGI script, as a resource residing on a server or graphics workstation, as a routine embedded in a dedicated ATM over DSL system, or the like. The ATM over DSL system can also be implemented by physically incorporating the system and method into a software and/or hardware system, such as the hardware and software systems of a communications transceiver.

It is, therefore, apparent that there has been provided, in accordance with the present invention, systems and methods for ATM over DSL. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

We claim:

1. An apparatus comprising:
a first transceiver operable at a first data rate; and
a second transceiver operable at a second data rate that is different than the first data rate,
wherein the transceivers are operable as bonded transceivers, and one or more of the first and the second transceivers are operable to one or more of determine and utilize at least one parameter associated with operation of at least one of the first and second transceivers to reduce a difference in latency between the first and second transceivers.

2. The apparatus of claim 1, wherein the at least one parameter is a Reed Solomon Coding parameter, an interleaving parameter or a framing parameter.

3. The apparatus of claim 1, wherein the apparatus is customer premises equipment that is capable of transporting cells or ATM cells.

4. The apparatus of claim 1, wherein the apparatus is customer premises equipment that is capable of transporting packets, Ethernet packets or Internet Protocol packets.

5. The apparatus of claim 1, wherein the transceivers include at least one digital signal processor.

6. The apparatus of claim 1, wherein the transceivers include at least one ASIC.

7. The apparatus of claim 1, further comprising:
operating a third transceiver in a customer premises at the first data rate; and
operating a fourth transceiver in the customer premises at the second data rate,
wherein at least one second parameter associated with operation of at least one of the third and fourth transceivers is configured to reduce a difference in latency between the third and fourth transceivers.

8. An apparatus comprising:
three or more transceivers, wherein:
a first one of the transceivers is operable at a first data rate,
a second one of transceivers is operable at a second data rate that is different than the first data rate,
the first one of the transceivers and the second one of the transceivers are operable as bonded transceivers, and
one or more of the first and the second transceivers are operable to one or more of determine and utilize at least one parameter associated with operation of at least one of the transceivers and the second one of transceivers to reduce a difference in latency between the first one of the transceivers and the second one of the transceivers.

9. The apparatus of claim 8, wherein the at least one parameter is a Reed Solomon Coding parameter, an interleaving parameter or a framing parameter.

10. The apparatus of claim 8, wherein the apparatus is one or more linecards that are capable of transporting cells or ATM cells.

11. The apparatus of claim 8, wherein the apparatus is one or more linecards that are capable of transporting packets, Ethernet packets or IP packets.

12. The apparatus of claim 8, wherein each of the first one of the transceivers and the second one of the transceivers includes at least one digital signal processor.

13. The apparatus of claim 8, wherein each of the first one of the transceivers and the second one of the transceivers includes at least one ASIC.

14. A method of operating devices of a telecommunications network, the method comprising:
configuring a first transceiver and a second transceiver to operate as bonded transceivers;
operating the first transceiver at a first data rate; and
operating the second transceiver at a second data rate that is different than the first data rate, wherein one or more of the first and the second transceivers are operable to one or more of determine and utilize at least one first parameter associated with operation of at least one of the first and second transceivers to reduce a difference in latency between the first and second transceivers.

15. The method of claim 14, wherein the telecommunications network is a DSL network.

16. The method of claim 14, wherein the at least one parameter is a Reed Solomon Coding parameter, an interleaving parameter or a framing parameter.

17. The method of claim 14, wherein the first and second transceivers are transporting cells or ATM cells.

18. The method of claim 14, wherein the first and second transceivers are transporting packets, Ethernet packets or Internet Protocol packets.

19. The method of claim 14, wherein the at least one second parameter is a Reed Solomon Coding parameter, an interleaving parameter or a framing parameter.

20. The method of claim 14, wherein the first, second, third and fourth transceivers transport cells or ATM cells.

21. The method of claim 14, wherein the first, second, third and fourth transceivers transport packets, Ethernet packets or IP packets.

22. The method of claim 14, further comprising transporting the packets, Ethernet packets or IP packets from a service provider to a DSL subscriber over a plurality of twisted pair wires.

* * * * *

UNITED STATES PATENT AND TRADEMARK OFFICE
CERTIFICATE OF CORRECTION

PATENT NO. : 8,831,031 B2
APPLICATION NO. : 13/863058
DATED : September 9, 2014
INVENTOR(S) : Marcos C. Tzannes et al.

It is certified that error appears in the above-identified patent and that said Letters Patent is hereby corrected as shown below:

In the Claims

At Column 14, Claim 20, line 35, delete "The method of claim 14," and insert -- The apparatus of claim 7, --

At Column 14, Claim 21, line 37, delete "The method of claim 14," and insert -- The apparatus of claim 7, --

At Column 14, Claim 22, line 40, delete "The method of claim 14," and insert -- The apparatus of claim 21, --

Signed and Sealed this
Eighteenth Day of August, 2015

Michelle K. Lee
*Director of the United States Patent and Trademark Office*